United States Patent [19]

Hiltman

[11] Patent Number: 4,713,735
[45] Date of Patent: Dec. 15, 1987

[54] FLASHLIGHT FOR USE IN VEHICLES
[76] Inventor: Paul D. Hiltman, 2543 Melinda Dr., Atlanta, Ga. 30345
[21] Appl. No.: 920,430
[22] Filed: Oct. 20, 1986
[51] Int. Cl.[4] .................................................. F21L 7/00
[52] U.S. Cl. .................................. 362/183; 362/191; 362/205
[58] Field of Search ............... 362/183, 207, 208, 205, 362/802, 253, 202, 191

[56] References Cited

U.S. PATENT DOCUMENTS

| 2,642,520 | 6/1953 | Coolidge et al. | 362/183 |
| 2,880,306 | 3/1959 | Witte | 362/183 |
| 4,203,150 | 5/1980 | Shamilan | 362/183 |
| 4,327,401 | 4/1982 | Siiberg | 362/183 |
| 4,422,130 | 12/1983 | Shigeo | 362/183 |
| 4,438,483 | 3/1984 | Gulliksen et al. | 362/183 |
| 4,598,340 | 7/1986 | Dwosh et al. | 362/183 |

FOREIGN PATENT DOCUMENTS 2853039  6/1980  Fed. Rep. of Germany ...... 362/183

Primary Examiner—James C. Yeung
Attorney, Agent, or Firm—Thomas & Kennedy

[57] ABSTRACT

A flashlight has a mounting plug by which it may be mounted to a vehicle dashboard socket at various orientations relative to the socket axis and at various rotary positions about the socket axis.

7 Claims, 6 Drawing Figures

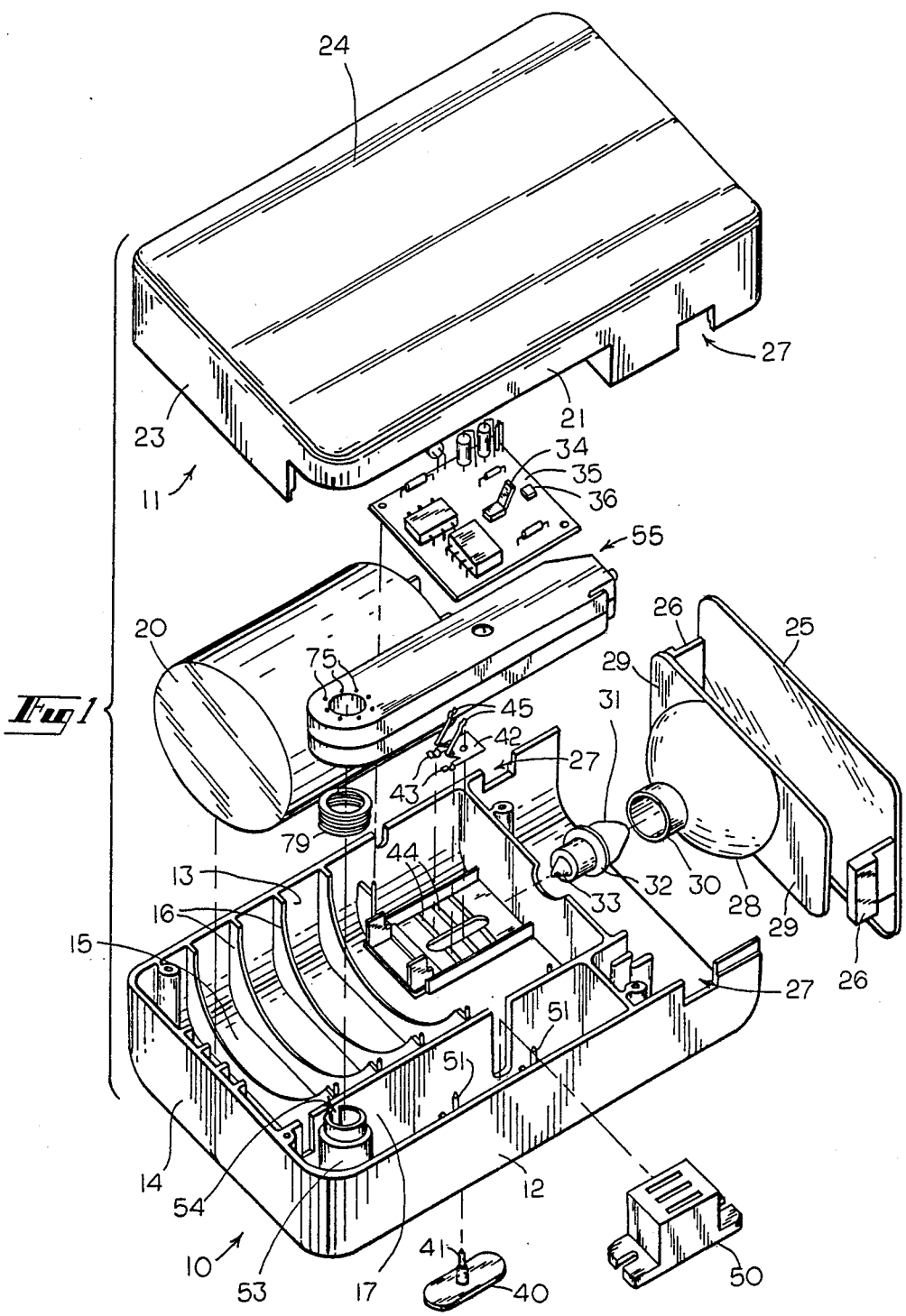

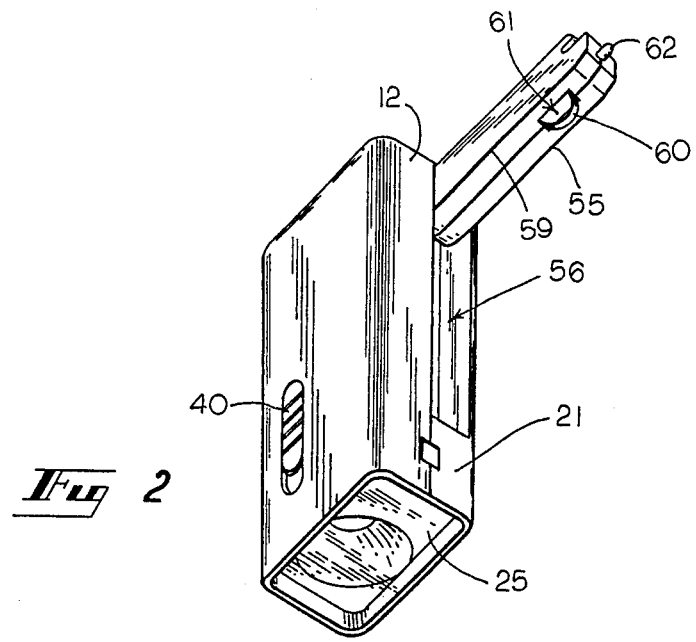
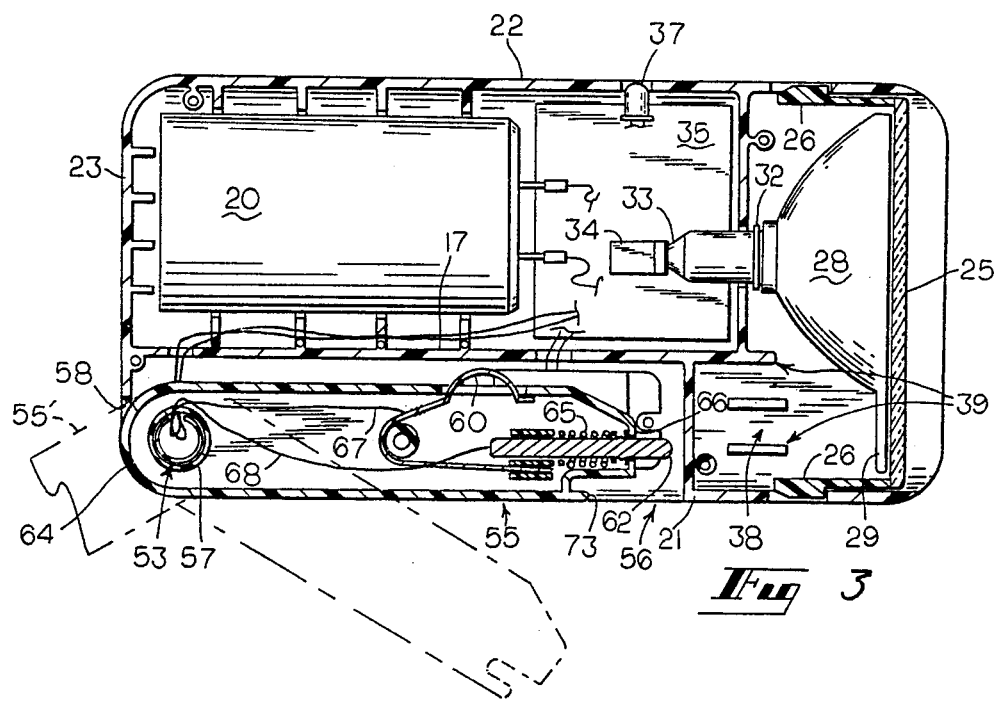

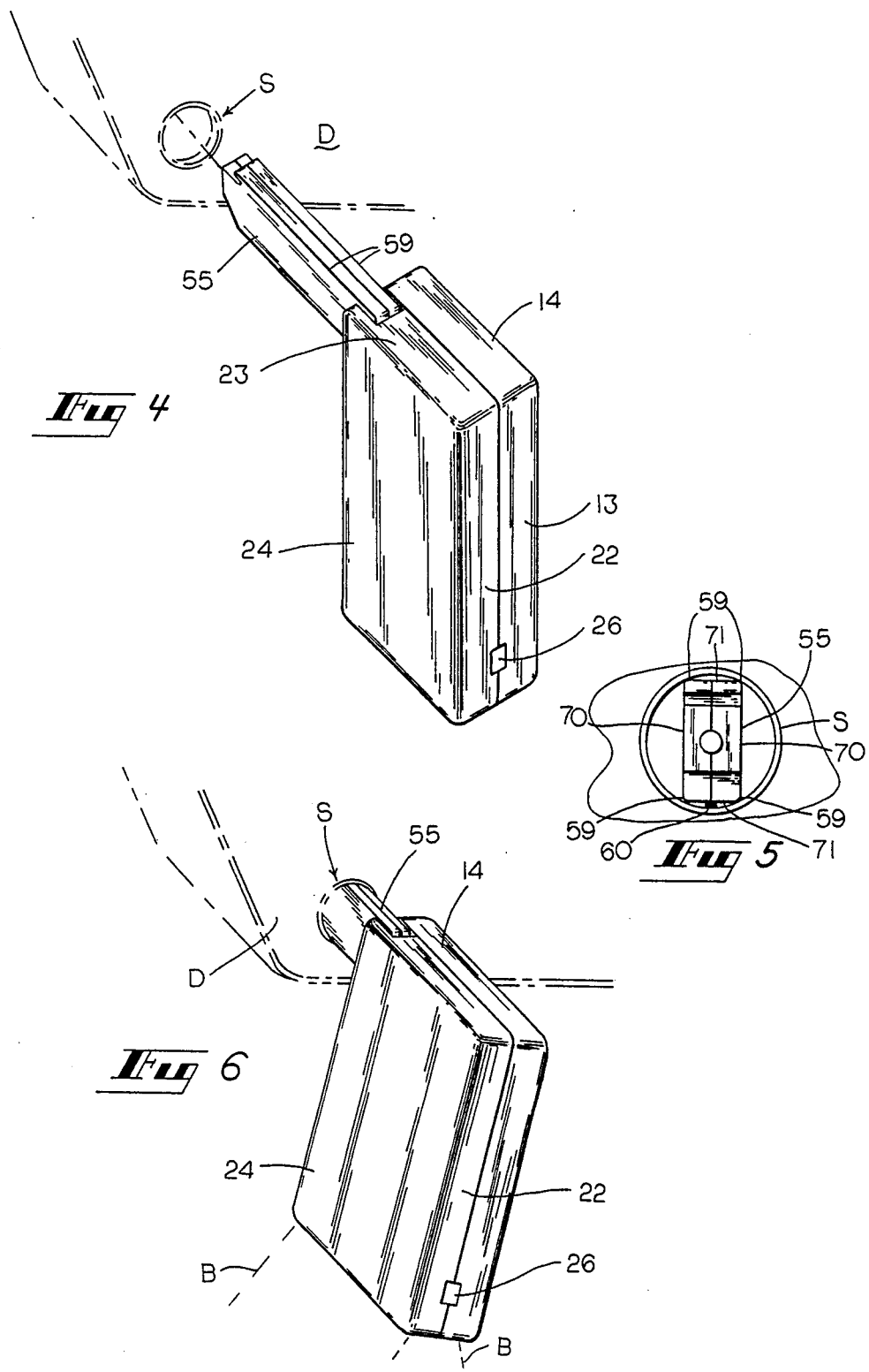

FLASHLIGHT FOR USE IN VEHICLES

TECHNICAL FIELD

This invention relates generally to flashlights, and particularly to flashlights of the type that are adapted for use in motorized vehicles that have electric sockets mounted on their dashboard.

BACKGROUND OF THE INVENTION

Flashlights are commonly carried in automobiles and trucks for use both within and outside of the vehicles. This use of general purpose type flashlights, however, has typically been productive of and accompanied by problems. For example, flashlights powered by non-rechargeable batteries, when stored over substantial periods of time in car trucks and glove compartments, often lose their charge so to be rendered inoperative when an occasion arises for which they are needed. Flashlights provided with an electric cord and plug adapted to be plugged into cigarette lighter sockets for power can only be used within the range of the cord length.

As exemplified by those shown in U.S. Pat. Nos. 3,880,306, 4,327,401 and 4,422,130, flashlights have been developed with rechargeable battery adapted to be recharged by being plugged directly into electric sockets so that the flashlight itself becomes mounted to the socket. These too, however, have had their problems. For example, where the plugs are for AC socket insertion, they are structurally obtrusive for normal flashlight operation. For this reason the U.S. Pat. No. 2,880,306 device was provided with a removable cover for the plugs and why the U.S. Pat. No. 4,422,130 device was provided with a hinged handle that could be positioned over the plug for normal use. In addition, as best illustrated by the U.S. Pat. No. 4,327,401 flashlight, these type of lights are normally quite small and low powered. Indeed, they commonly are referred to as "night lights" where they are used in homes and as "map lights" where they are used in vehicles. This size limitation is inherent in their design, i.e. they are mounted by means of sockets that themselves are not designed to support significant weight. In addition, they protrude outwardly from the socket bearing wall such that they are very susceptible to being accidently struck. In the confines of a car cabin, they would also create quite an obstruction were they to be made of a substantial size so as to produce a substantial light.

Accordingly, the present invention is directed at providing a flashlight for vehicular use which may be readily mounted and dismounted within the vehicle cabin for recharge and use in a manner that mitigates the just described problems.

SUMMARY OF THE INVENTION

In one form of the invention a flashlight is provided for use in vehicles which have a cylindrical socket mounted on the vehicle dashboard that is coupled with a source of electric power. The flashlight comprises a housing formed with an elongated recess in which housing a battery and a lamp are mounted. An elongated plug, electrically coupled with the battery, is mounted for pivotal movement between a stowed position located substantially within the housing recess and operative positions protruding out of the recess. In its operative positions the plug is adapted to be inserted into the socket for recharging of the flashlight battery and for the projection of a light beam by the lamp at various directions from the dashboard dependent on the rotary position of the plug within the socket.

In another form of the invention a flashlight comprises a housing and a mounting plug pivotably mounted to the housing for movement between a stowed position located closely adjacent the housing and mounting positions extending away from the housing. A storage battery is mounted within the housing. Lamp means are electrically coupled with the storage battery through switch means for projecting a beam of light from one end of the housing. The flashlight also comprises means for coupling the storage battery with a source of electric power for battery recharge which includes a pair of electric contacts carried on the mounting plug.

BRIEF DESCRIPTION OF THE DRAWING

FIG. 1 is an exploded view, in perspective, of a flashlight embodying principles of the invention in a preferred form.

FIG. 2 is a perspective view of the flashlight illustrated in FIG. 1 shown with its mounting plug in an extended position for mounting.

FIG. 3 is a side view, in cross-section, of the flashlight illustrated in FIG. 1 with the mounting plug shown in its stowed position.

FIG. 4 is a perspective view of the flashlight illustrated in FIG. 1 shown with its mounting plug extended and positioned for insertion into the socket on a vehicle dashboard.

FIG. 5 is a an end view of the mounting plug of the flashlight as viewed looking out of a vehicle socket in which the plug is inserted.

FIG. 6 is another perspective view of the flashlight illustrated in FIG. 1 shown being inserted into the dashboard socket and oriented at an incline with respect to vertical.

DETAILED DESCRIPTION

With reference next to the drawing, there is shown a flashlight having a plastic housing comprised of a base 10 and a cover 11 adapted to be mated and sealed together as by an adhesive. The base is seen to have two side walls 12 and 13 and a rear wall 14. The side walls 12 and 13 and the rear wall 14 all project upwardly from a bottom wall 15. A set of ribs 16 extends upwardly from the bottom wall 15 so as to span the space between the side wall 13 and an interior wall 17. These ribs are configured to support a cylindrical storage battery 20 mounted thereon.

The cover 11 is similarly seen to have two side walls 21 and 22 and a rear wall 23 which all project downwardly from a top wall 24. It should, of course, be understood that here the terms top and bottom are merely used for clarity of expression with reference to the drawing since the flashlight itself may be oriented in any direction.

With continued reference to the drawing the flashlight is further seen to have a transparent lens 25 from which two resilient tabs 26 rearwardly extend for interlocking engagement with two slots 27 formed jointly within the side walls 12 and 13 of the housing base member and the side walls 21 and 22 of the cover. A reflector 28, having a planar front flange 29, is mounted flushly against the inside surface of the lens 25 between the tabs 26, as best shown in FIG. 3. the rear end of the reflector 28 has a tubular throat 30 into which an incandescent lamp bulb 31 extends to the focal point of the reflector. In its mounted position a bulb flange 32 is urged against the annular end of the reflector throat 30. The bulb contact tip 33 is in engagement with a resilient contact 34 mounted upon a circuit board 35 while the bulb cylindrical side contact is in engagement with another contact 36 mounted on the circuit board. A space 38 is provided beside the reflector in which to stow a replacement bulb behind the lens and reflector press-fitted between two posts 39. A battery charging bulb 37 is mounted to the circuit board within an opening to ambience in wall 13.

A slide switch 40 is mounted for limited sliding movement within a slot formed in the housing base floor 15. The slide switch has a projection 41 to which a switch contact 42 is mounted for movement between selected switch positions. These positions are composed of an off-transport position, an off position, an on-dim position and an on-bright position. As the switch is manually repositioned, arms 43 of the switch contact 42 come into detenting engagement with grooves 44 formed adjacent the slot in which the slide switch 40 is movably positioned. Movement of the switch thus causes spring biased legs 45 of the switch contact to make and break engagement with elements on the circuit board 35 so as to connect and disconnect the incandescent lamp bulb 31 with the battery 20. The flashlight also includes a buzzer 50 for use in emitting battery low voltage alarm beeps. The buzzer is mounted to the floor 15 of the base and held in place by two swedge pins 51 between the base side wall 12 and the interior wall 17. A boss 53 is also mounted to the floor 15, within this space which has a slot 54 formed along a side of an upper end thereof. The electrical circuitry itself is conventional and therefore not described in detail.

A hollow mounting and recharge plug, indicated generally at 55, is pivotably mounted about the boss 53 for movement between a stowed position located within a housing recess 56 and several extended positions projecting out of the recess. The recess 56 is partially formed by a notched or stepped area formed in walls 21 and 23 of the cover 11. The mounting plug is generally rectangular in cross section and is formed with an annular bearing or collar 57 sized to be fitted about an upper portion of boss 53 for pivotal movement. Thus, the mounting plug may be moved from its stowed position within recess 56, as shown in FIG. 3, to other positions protruding out of the housing recess as shown in broken lines in FIG. 3. At position 55' it strikes a stop 58 at the end of the recess-defining slot in wall 14. Being generally rectangular in cross section, and thus parallelpiped, the plug has four mutually parallel, linear corners 59 with diametrically opposite corners spaced apart approximately the inside diameter of a cylindrical, electric socket S mounted on a vehicle dashboard D.

With this construction the plug may be inserted into the socket S with the corners 59 making sliding contact with the internal cylindrical wall of the socket, as shown best in FIG. 5. That this contact is made along most of the length of the plug results in high frictional engagement being made between plug and socket upon deep insertion.

The plug 55 has a spring biased ground contact 60 that projects out of the plug through a slot 61, and a plunger-type contact 62 that projects out of the end of the plug located distal its pivotably mounted end 64. The plunger contact is biased by a compression spring 65 outwardly with outbound movement limited by a washer 66. Insulated electric conductors 67 and 68 extend from the contacts 60 and 62 out of the plug through a slot in boss 53 to the circuit board 35.

It should also be noted that the mounting plug 55 is not square in section but rather thin or slab shaped. Plug side walls 70 are thus substantially wider than side walls 71. In this manner the plug is designed to be compactly stowed within the housing recess above the buzzer 50 while yet retaining its capability of making snug, frictional engagement with the socket S.

For use the flashlight may be stored in a vehicle, such as within its glove compartment, and used from time to time inside and outside the vehicle by manual operation of the slide switch 40. This is normally done with the plug 55 stowed within the elongated housing recess. Alternatively, the flashlight may be mounted to the vehicle dashboard D and oriented so as to project a beam of light in various directions. This is done by gripping a lip 73 formed on the mounting plug 55 adjacent plunger contact 62 and pivoting the plug out of the housing recess. As this is done an annular array of detent bumps 75 make detenting engagement, under pressure provided by a spring 79, with mating detent means carried on the inside of cover wall 24. In this manner the plug may be pivoted through several distinct angular positions of protrusion out of the housing recess. In FIGS. 2, 4 and 6 it is shown protruding out of the recess at a right angle.

With the plug extended it may be inserted into the socket S, as shown being done in FIGS. 4 and 5, thereby mounting the flashlight to the dashboard D. Once it has been fully inserted its sides 12 and 21 abut the dashboard D beneath the socket S which abutment serves to prevent substantial moment from being applied to the socket itself. In this position the flashlight is snugly positioned against the dashboard so as not to provide an obstruction that would be susceptable to being accidentally struck. While within the socket its contacts 60 and 62 are directly connected to those of the socket whereby the flashlight battery 20 is coupled with the vehicle power supply and is thereby recharged. The flashlight may then be rotated somewhat as shown in FIG. 6 to reorient its light beam B. Thus, the flashlight may be both rotated about the socket axis as well as tilted with respect to that axis. Therefore, the flashlight in this mode is held in a mounted position with its beam reorientable in many directions, and with its own battery being recharged at the same time. Once such use is no longer desirable, it may be removed from the dashboard of the mounting plug and returned to the housing recess for flashlight storage.

It should be understood that the just described embodiment merely illustrates principles of the invention in one preferred form. Many modifications, additions and deletions may be made thereto without departure from the spirit and scope of the invention as set forth in the following claims.

I claim:

1. A flashlight for use in vehicles which have a cylindrical socket mounted on a dashboard that is coupled with a source of electric power, and with the flashlight comprising a housing formed with an elongated recess, a battery mounted within said housing, a lamp mounted within said housing and electrically coupled with said battery through switch means, and an elongated plug electrically coupled with said battery and mounted for pivotal movement between a stowed position substantially within said housing recess and operative positions protruding out of said recess for insertion into the socket for recharging of said battery and for the mounted projection of a light beam by said lamp at variously selected directions from the dashboard that are dependent upon the rotary position of said plug within the socket.

2. The flashlight of claim 1 wherein said plug is generally parallelpiped with four corner edges adapted to make contact with the cylindrical wall of the socket.

3. The flashlight of claim 1 further comprising detent means for releasibly holding said plug in a plurality of pivotal positions relative to said housing recess.

4. The flashlight of claim 1 wherein said lamp is mounted for the projection of a light beam from one end of said housing, and wherein said plug is pivotably mounted adjacent an end of said housing located opposite said one end.

5. The flashlight of claim 1 wherein said plug is formed with a lip by which it may be manually gripped by a human finger tip for pivoting it out of said recess to said operative positions.

6. A flashlight for use in vehicles which have a cylindrical socket mounted on a dashboard that is coupled with a source of electric power, and with the flashlight comprising a housing formed with an elongated recess, a battery mounted within said housing, a lamp mounted within said housing and electrically coupled with said battery through switch means, and an elongated plug electrically coupled with said battery and mounted for pivotal movement between a stowed position substantially within said housing recess and operative positions protruding out of said recess for insertion into the socket for recharging of said battery and for the mounted projection of the light beam by said lamp at variously selected directions from the dashboard that are dependent upon the rotary position of said plug within the socket, and wherein said plug is generally parallelpiped with four corner edges adapted to make contact with the cylindrical wall of the socket and wherein said plug is hollow and has a dielectric body formed with a slot through which a resilient, spring biased electric ground contact projects for engagement with the wall of the cylindrical socket between two of said corner edges.

7. The flashlight of claim 6 wherein said plug body is formed with an opening at one end through which a spring biased electric contact plunger protrudes.

* * * * *